United States Patent

[11] 3,632,920

[72] Inventor: Leonard P. Tetrault, Northport, N.Y.
[21] Appl. No.: 825,838
[22] Filed: Mar. 19, 1969
[45] Patented: Jan. 4, 1972
[73] Assignee: Aerodyne Controls Corporation, Farmingdale, N.Y.

[54] ACCELERATION-RESPONSIVE SWITCH
10 Claims, 4 Drawing Figs.
[52] U.S. Cl. .................................................. 200/61.53
[51] Int. Cl. ...................................................... H01h 35/14
[50] Field of Search .......................................... 200/61.45, 61.53, 77; 340/262

[56] References Cited
UNITED STATES PATENTS
3,337,701  8/1967  Prebilic .................... 200/61.45
3,022,393  2/1962  Weaver .................... 200/61.45

Primary Examiner—Robert K. Schaefer
Assistant Examiner—M. Ginsburg
Attorney—Edward H. Loveman ABSTRACT: An acceleration switch comprised of a housing having an internal cylindrical bore of at least two different diameters. A mass is adapted to move longitudinally within the smaller diameter bore into the larger diameter bore under excessive acceleration forces and thereby cause a compressed spring contact to expand so as to form an electrical contact bridge. This will alert the user that the switch was subjected to excessive forces.

PATENTED JAN 4 1972 3,632,920
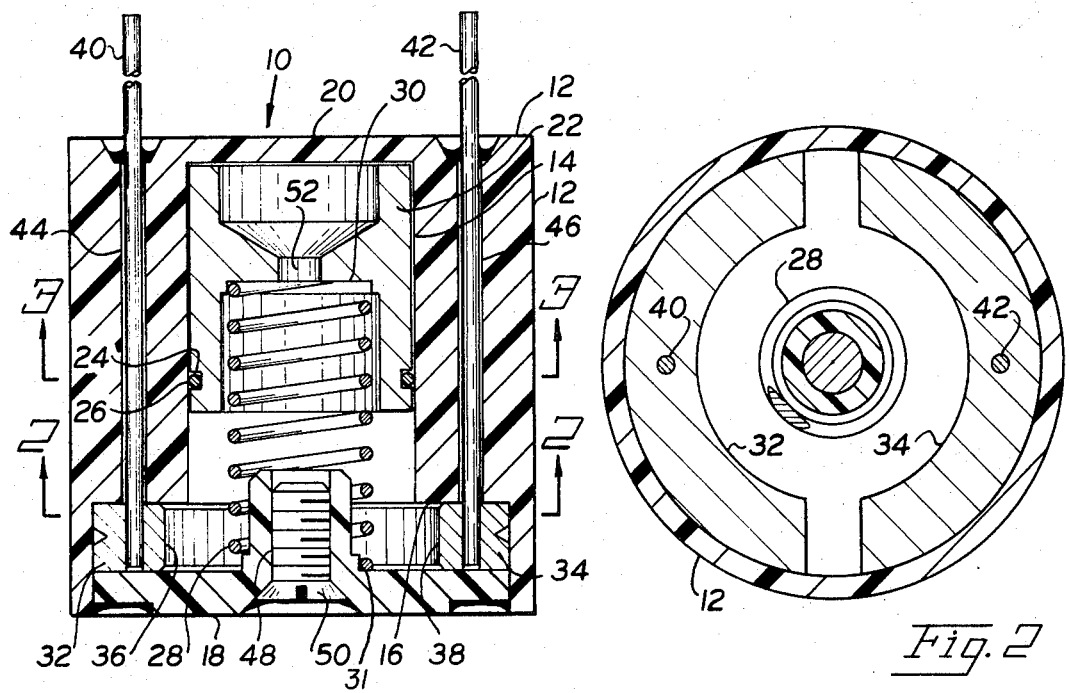
Fig. 1
Fig. 2
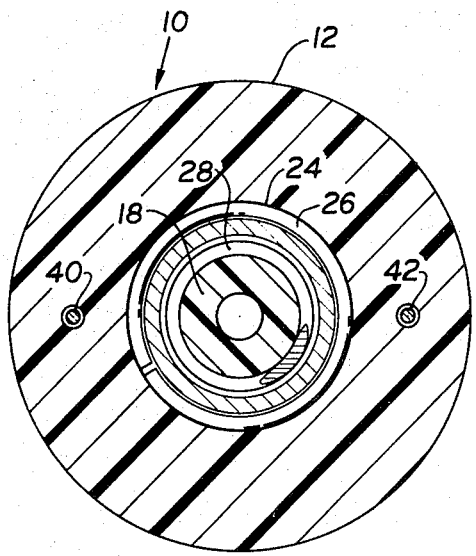
Fig. 3
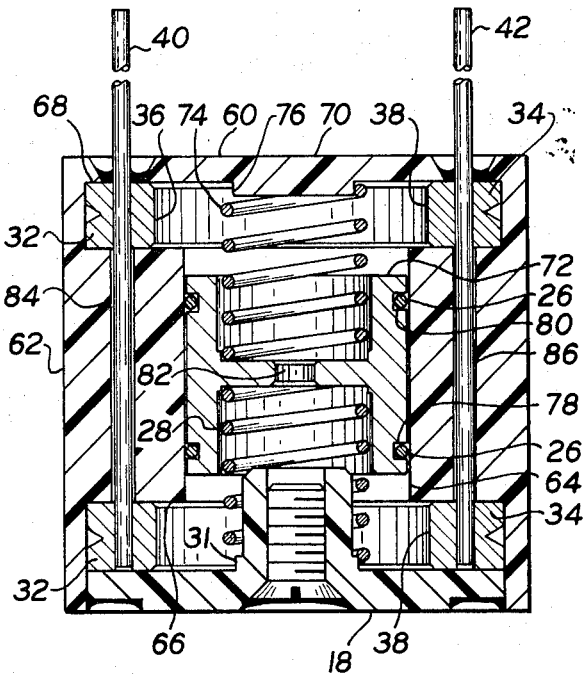
Fig. 4
INVENTOR
LEONARD P. TETRAULT
BY
Edward H. Loveman
ATTORNEY

008
ACCELERATION-RESPONSIVE SWITCH

This invention relates to an indicator device and, more particularly, to an improved and novel device for measuring the forces of shock, impact or acceleration. The invention especially discloses a unique miniaturized acceleration-responsive switch which is extremely simple in construction and which may be inexpensively manufactured.

In industry and numerous fields of technology, acceleration-responsive switches or devices are widely employed for measuring or sensing continuous or maximum acceleration forces. For certain applications, only maximum acceleration forces need be known, since this particular information discloses whether or not predetermined tolerances of shock or vibration have been exceeded, with the likelihood of damage having been sustained by the apparatus or component subjected to such forces. In particular, this type of maximum acceleration measurement becomes of great significance and importance in the evaluation of a aircraft or space technology components, or in connection with the shipment or use of delicate instruments or other fragile articles. Although acceleration-responsive switches for sensing and measuring the maximum acceleration, shock or impact forces encountered, are presently in use, these have been and are of a generally complex and cumbersome construction, are not sufficiently precise in their acceleration sensing characteristics, and furthermore, are not particularly economical to manufacture.

The acceleration-responsive switch according to the present invention obviates the disadvantages and drawbacks encountered in the prior art by providing a device of extremely simple and inexpensive construction which will readily indicate whether the apparatus or component to which it is attached has been subjected to acceleration forces, shock or impact beyond allowable tolerances. Accordingly, the present invention contemplates the provision of an electrical nonconductive housing having internal cylindrical bores of at least two different diameters. A movable cylindrical mass or slug is longitudinally slidable within the smaller diameter bore, and has a compressed spring contact positioned in a groove extending about the periphery of the movable mass. When the switch is subjected to an axial acceleration force beyond a predetermined level or tolerance, the mass will slide toward the bore having an enlarged diametral dimension whereby the compressed spring contact will radially expand or snap outwardly into the enlarged portion of the bore so as to bridgingly contact a pair of spaced electrical contacts positioned in the enlarged bore portion. This, in effect, will place the contacts in an electrically conductive relationship and permit their connection to an electrical circuit for testing if the circuit has been closed by the excessive acceleration force or shock. Suitable spring means and electrically nonconductive damping fluids may be provided within the bore in order to control the acceleration-responsive characteristics of the movable mass.

Accordingly, it is a primary object of the present invention to provide for a novel and improved acceleration-responsive indicator device adapted to measure and sense maximum acceleration forces along a predetermined sensing axis.

Another object of the present invention is to provide for a novel acceleration switch incorporating a movable mass adapted to close an electrical circuit when the maximum acceleration, shock or impact exceeds an allowable tolerance level.

A further object of the present invention is to provide an improved acceleration switch including a movable sliding mass having an expandable metallic member which is adapted to form an electrical bridge between two electrical contact points when the acceleration forces on the switch exceed allowable tolerance levels.

These and other objects and many of the attendant advantages of this invention will be readily appreciated as the same becomes better understood by reference to the following detailed description when considered in connection with the accompanying drawings, in which;

FIG. 1 is a longitudinal cross-sectional view of one embodiment of the device according to the present invention;
FIG. 2 is a sectional view along line 2—2 in FIG. 1;
FIG. 3 is a sectional view along line 3—3 in FIG. 1; and
FIG. 4 is a longitudinal cross-sectional view of a second embodiment of the device according to the present invention.

Referring now to the drawings, wherein like reference characters designate like or corresponding parts throughout the several views, in FIGS. 1 to 3 there is illustrated an acceleration-responsive switch, generally designated as reference numeral 10. The switch 10 includes a casing or housing 12, preferably formed of a plastic material. The housing 12 has a generally cylindrical bore 14 which has an enlarged diametrical end portion 16. A closure member 18 is adapted to seal the bore 14 at bore end 16 while the other end of bore 14 is sealed off by a housing end wall 20.

A generally cylindrical mass or slug 22 is positioned within bore 14 and adapted to slide therealong in a freely moving relationship. A peripheral groove 24 in cylindrical mass 22 contains an expandable resilient spring contact 26 which normally presses radially outwardly against the surface of bore 14. The spring contact 26 may be manufactured of any electrically conductive spring material and in its relaxed position resembles a split ring with a gap between the split ends. When the contact 26 and the mass 22 are positioned within the bore 14, the spring contact 26 may be compressed such that the gap between the split ends is vertically nonexistent. The cylindrical mass 22 is normally retained in bore 14 adjacent to housing end wall 20 by means of a compression spring 28 which extends between an inner flange 30 on cylindrical mass 22 and a shoulder 31 on closure member 18.

A pair of arcuate, spaced electrical contact shoes 32, 34 are positioned in enlarged bore portion 16, and are sandwiched between housing 12 and closure member 18 so that the radially inner surfaces 36, 38 of contact shoes 32, 34 form a bore somewhat larger than bore 14. Electrical wires 40, 42 are each fastened by welding, brazing, or other conventional well-known means, to respective contact shoes 32, 34 and extend through sealed apertures 44, 46 in housing 12.

The interior of housing 12 may then be filled with a fluid having electrically nonconductive properties through a threaded aperture 48 in closure member 18. The aperture 48 may then be closed by means of a screw 50, and the entire assembly or switch 10 sealed through the application of a suitable plastic sealant.

In operation, one or more switches 10 may be positioned in a shipping carton containing delicate instruments. If the carton is subjected to acceleration forces, shocks or impacts beyond an allowable tolerance during shipment, the acceleration force applied to cylindrical mass 22 against spring 28 will be sufficient to compress the latter and permit mass 22 to slide along bore 14 toward enlarged bore end 16. As may be readily evident, the acceleration force tolerance required to cause movement of mass 22 along bore 14 is determined by the force of compression spring 28 against the mass 22. The viscosity of the fluid in housing 12 will determine the response characteristics of the switch 10.

As the groove 24 on the periphery of mass 22 reaches the enlarged bore portion 16 the compressed resilient spring contact 26 will snap or deflect radially outwardly until it contacts the surfaces 36, 38 on electrical contact shoes 32, 34, whereby the spring contact 26 forms an electrical conduit or bridge between contact shoes 32, 34. Thus, when the instruments are unpacked at their shipping destination points, it is a simple matter to serially connect wires 40, 42 of a switch 10 to a conventional audio or visual electrically powered alarm. If the switch 10 had been subjected to acceleration forces or shocks of magnitudes whereby the spring contact 26 formed an electrical bridge with contact shoes 32, 34, the alarm will be electrically energized. This indicates that the shipped instruments or components sustained shock or acceleration beyond the allowable tolerance. Conversely, if the ring 26 is still within its groove 24 in contact with the surface of bore 14, the alarm will not be energized indicating that the instruments were not subjected to excessive acceleration forces, shock or impact.

The fluid within housing 12 acts primarily as a damping fluid. As the mass 22 moves toward bore end 16, the fluid located in the bore portion between the mass 22 and closure member 18 is allowed to pass through an aperture 52 in mass 22 toward the housing end wall 20. By varying the viscosity of the fluid, devices having different acceleration-responsive characteristics may be produced without extensive manufacturing modifications.

The second embodiment of the invention illustrated in FIG. 4 of the drawings is generally similar in principle of operation to that of the device in FIG. 1. However, whereas the switch 10 in FIG. 1 is designed so that mass 22 moves along bore 14 in one direction, the device according to this embodiment can more in either one of two coaxial directions. In this instance, the switching device 60 includes a housing 62 having a cylindrical bore 64. Each end of bore 64 extends into a diametrically enlarged bore portion 66, 68, each containing a pair of spaced arcuate electrical contact shoes 32, 34. The housing 62 is sealed at one end by its end wall 70, and at its other end by closure member 18 seated in bore portion 66.

A cylindrical mass 72 is freely slidable within bore 64 and balanced longitudinally centrally thereof by a pair of opposed compression springs 28, 74 which are positioned about respective shoulders 31 and 76. The outer peripheral surface of mass 72 contains a pair of spaced grooves 78, 80, each containing a resilient spring contact 26 compressed within bore 64. As in the embodiment of FIG. 1, the interior of housing 62 is filled with an electrically nonconductive fluid which can freely pass through aperture 82 in mass 72 upon movement of the latter along bore 64.

Each of the contact shoes 32 and contact shoes 34 are interconnected respectively by wires 40, 42 passing through sealed apertures 84, 86 in housing 62. The entire assembly is sealed against fluid leakage by means of a suitable plastic sealant.

During operation, as the switch 60 is subjected to an acceleration force, shock or impact of sufficient intensity to move mass 72 along bore 64 in either axial direction, that is, toward closure member 18 or toward housing end wall 70, one of the compressed contact springs 26 will snap outwardly either in bore portion 66 or bore portion 68. This will cause the extended spring contact 26 to form an electrical bridge between its connected set of contact shoes 32, 34. Accordingly, this particular embodiment affords measurement of bidirectional shock loads or acceleration forces and thus increases the versatility of the switch device.

Although the invention has been described as being used with alarm circuits, it is obvious that the output signal from the electrical bridge may be used for detonating an explosive charge, opening a door, etc. Moreover, if desired, the housing 12 may be manufactured of a transparent material such as an acrylic plastic whereby the position of the contact springs in the enlarged bore portion may be visually observed.

It will now appear that in accordance with the objects, a unique acceleration switch has been disclosed which will indicate that it has been actuated even if the mass 22 is returned to its original position with the bore portion 14.

The foregoing disclosure relates to only a preferred embodiment of the invention, and is intended to cover all changes and modifications of the example of the invention herein chosen for the purposes of disclosure, which do not constitute departures from the spirit and scope of the invention.

What is claimed is:

1. An acceleration switch comprising:
a housing having a generally cylindrical bore extending longitudinally therein,
a generally cylindrical mass being disposed within said bore with radial clearance for movement along the longitudinal axis of said bore in response to a predetermined acceleration having at least a component along said axis,
said bore having a diametrically enlarged portion at least at one end thereof,
spaced electrical contact means positioned within said enlarged bore portion,
said movable cylindrical mass including at least a peripheral groove, and
a spring contact means positioned in said peripheral groove, whereby said cylindrical mass, in response to said predetermined acceleration, will move toward said diametrically enlarged portion of said bore such that said peripheral groove enters said diametrically enlarged portion thereby permitting said spring contact means to radially expand so as to form an electrical contact bridge between said spaced electrical contact means.

2. A switch as defined in claim 1 further including a damping means located in said bore and adapted to control the acceleration response of said cylindrical mass.

3. A switch as defined in claim 1 wherein said spaced electrical contact means comprise a pair of arcuate electrical contact shoes,
and a pair of electrical wires extending through said housing, each of said wires being connected respectively to, one of said contact shoes, said wires being adapted to be connected to an electrically powered alarm.

4. A switch as defined in claim 1 wherein said housing includes an end wall which closes off one end of said bore and a closure mounted on said housing to close off the other end of said bore.

5. A switch as defined in claim 4, further including a resilient biasing means positioned in said bore,
said biasing means normally maintaining said movable cylindrical mass in axially spaced relationship from said enlarged end portion of said bore.

6. A switch as defined in claim 5 wherein said resilient biasing means comprises a compression spring member.

7. A switch as defined in claim 1 wherein each end of said bore includes an enlarged diameter portion,
a pair of spaced electrical contact means being positioned in each of said enlarged diameter portions,
said cylindrical mass having a peripheral groove adjacent each end thereof, and
a pair of spring contact means each one of said spring contact means being positioned respectively in each of said grooves, whereby movement of said cylindrical mass toward either end of said bore in response to a predetermined acceleration, causes said spring contact means adjacent said bore end, to radially expand into the enlarged diameter portion so as to form an electrical contact bridge between the spaced electrical contact means in said enlarged diameter portion.

8. A switch as defined in claim 7 including a damping fluid in said bore to control the acceleration response of said cylindrical mass.

9. An acceleration switch comprising:
a housing having a generally cylindrical bore extending longitudinally therein and an end wall which closes off one end of said bore, said housing being manufactured of a transparent material,
a closure member mounted on said housing so as to close the other end of said bore,
a generally cylindrical mass being disposed within said bore with radial clearance for movement along the longitudinal axis of said bore in response to a predetermined acceleration having at least a component along said axis,
said bore having a diametrically enlarged portion at one end thereof,
a resilient biasing means positioned in said bore and adapted to normally maintain said cylindrical mass in axially spaced relationship from said enlarged end of said bore,
said cylindrical mass including at least a peripheral groove thereon, and
an expandable spring contact means positioned in said peripheral groove and compressed to fit within said bore whereby said cylindrical mass in response to said predetermined acceleration will move toward said diametrically enlarged portion of said bore such that said peripheral groove enters said diametrically enlarged portion thereby permitting said spring contact means to radially expand and be visible through said transparent housing.

10. A switch as defined in claim 9 wherein each end of said bore includes a diametrically enlarged portion, said cylindrical mass having a peripheral groove adjacent each end thereof, and wherein said expandable spring contact means comprise, a pair of spring contact means, each of said spring contact means being positioned respectively in each of said grooves.

* * * * *